May 23, 1950          G. L. LANG          2,508,524
ELECTROMAGNETIC DEVICE

Filed Dec. 15, 1945          4 Sheets-Sheet 1

GREGOR L. LANG
*INVENTOR.*

BY Raymond A. Paquin
*ATTORNEY.*

May 23, 1950 G. L. LANG 2,508,524
ELECTROMAGNETIC DEVICE
Filed Dec. 15, 1945 4 Sheets-Sheet 2

GREGOR L. LANG
INVENTOR.

BY Raymond A. Paquin
ATTORNEY.

May 23, 1950     G. L. LANG     2,508,524
ELECTROMAGNETIC DEVICE

Filed Dec. 15, 1945     4 Sheets-Sheet 3

GREGOR L. LANG
*INVENTOR.*

BY *Raymond A. Saquin*
ATTORNEY.

May 23, 1950 G. L. LANG 2,508,524
ELECTROMAGNETIC DEVICE
Filed Dec. 15, 1945 4 Sheets-Sheet 4

GREGOR L. LANG
*INVENTOR.*

BY
*ATTORNEY.*

Patented May 23, 1950

2,508,524

UNITED STATES PATENT OFFICE 2,508,524

ELECTROMAGNETIC DEVICE

Gregor L. Lang, Longmeadow, Mass., assignor to American Bosch Corporation, Springfield, Mass., a corporation of New York Application December 15, 1945, Serial No. 635,371

8 Claims. (Cl. 171—209)

This invention relates to a new and improved electromagnetic device or circuit and more particularly to such a device or circuit which may be constructed in the form of alternators, magnetos and synchronous electric motors and which lends itself to coaxial or cylindrical construction that requires only one cover or opening whereby an assembly of the essential components can be inserted or removed as a unit for assembly or service.

An object of the invention is to provide an electromagnetic device of the type set forth wherein the same rotor or stator poles or teeth are used more than once during a given revolution, thereby utilizing a smaller rotor with a fewer number of poles or teeth and thereby providing a more compact, coaxial magnet and rotor construction than possible with prior type constructions.

Another object of the invention is to provide a device of the type set forth which utilizes the flux on one side of the machine and then on the other alternately, thereby making possible the use of the rotor poles repetitively.

Another object of the invention is to provide a device of the type set forth wherein the rotor or stator embodies a physical number of poles other than the effective or equivalent electrical number.

Another object of the invention is to provide a device of the type set forth wherein the rotor or stator embodies a physical number of poles less than the effective or equivalent electrical number.

Another object of the invention is to provide a device of the type set forth wherein the rotor embodies a physical number of poles which is less than one-half the effective or equivalent number thereof.

Another object of the invention is to provide a compact, coaxial magneto which does not require the use of gears internally or externally.

Another object of the invention is to provide a rotating inductor type magneto of the gearless type for six or eight cylinder engines and which operates at one-half engine speed.

Another object of the invention is to provide a magneto which is gearless and operates at camshaft (one-half crankshaft) speed.

Another object of the invention is to provide a coaxial magneto which requires only one opening through which the assembly of major components can be removed as a unit for assembly and service.

Another object of the invention is to provide an electromagnetic device wherein the stator members are so positioned as to register at irregular intervals with the poles or teeth of the rotor member.

Another object of the invention is to provide an electromagnetic device in which leakage or magnetic reluctance is decreased.

Another object of the invention is to provide a multiple toothed stator for an electromagnetic device in which adjacent teeth are of like polarity.

Another object of the invention is to provide a new and improved electromagnetic device in which the stator members of like polarity are adjacent each other and segregated from stator members of opposite polarity.

Another object of the invention is to provide a new and improved stator member for an electromagnetic device.

Another object of the invention is to provide an electromagnetic device such as a synchronous motor having increased torque which may be obtained through the simultaneous use of more than one pole piece.

Another object of the invention is to provide a new and improved electromagnetic device in which the stator members of like polarity are in adjacent relation and wherein said stator members are so positioned as to provide irregular or varying timed intervals between pulses.

Another object of the invention is to provide a new and improved electromagnetic device in which a plurality of parallel flux paths are provided in the stator member to thereby make maximum use of available material and produce at the same time a design in which the gap area is at a maximum with the effective gap reluctance reduced to a minimum.

Another object of the invention is to provide a compact, cylindrical magneto having a coaxial core, and having a rotor and stator rotatable relative to each other with the rotor having a physical number of poles which is less than the effective or equivalent electrical number.

Other objects and advantages of the invention will be apparent from the following description taken in connection with the accompanying drawings. It will be understood that many changes may be made in the details of construction and arrangement of parts without departing from the spirit of the invention as expressed in the accompanying claims. I, therefore, do not wish to be limited to the exact details of construction and arrangement of parts shown and described, as the preferred form has been given by way of illustration only.

While the invention has been shown applied to magnetos for the purpose of illustration, it will be understood that it is also applicable to other electrical devices such as alternators and synchronous electric motors.

Referring to the drawings.

Prior type magnetos have had a number of drawbacks, particularly as the coil was not coaxial and did not lend itself to the design of a cylindrical magneto. This required that the magneto have two covers, one for the coil and the other for mechanical assembly. The two covers made freedom from radio interference radiation difficult to obtain and also because the magneto was not cylindrical or coaxial, accessibility for service was limited and difficult.

In addition to the above drawbacks with prior types, except two and four cylinder magnetos, fractional gear ratios were necessary both in the primary and distributor drives to obtain the desired number of flux reversals, which were difficult to construct and necessarily increased the cost of the construction. Also, in addition to the gear systems necessary for obtaining the necessary speed ratios, a further gear was necessary to bring the distributor to one-half engine speed for the proper timing of the magneto. Furthermore with some forms of engines such as sixty degree V–8 engines, it was not possible to use a single magneto for the two sets of cylinders, thereby requiring the use of two four cylinder magnetos with gear meshed to give sixty degree out-phasing of magnetic reversals and the engine treated ignition wise as two separate four cylinder engines each requiring separate magnetos.

It, therefore, is the object of the present invention to provide a new and improved electromagnetic device or circuit capable of employment in a magneto, alternator and synchronous electric motor and which has a coaxial core and wherein the same poles or teeth on the stator or rotor are utilized more than once during a given revolution and which is capable of employment in a magneto of coaxial or cylindrical construction wherein the whole assembly may be inserted or removed as a unit, thereby facilitating assembly and service and which requires no gears either internally or externally and with which a single magneto may be employed with sixty degree V–8 engines and which lends itself to the design of a magneto for from four to eighteen cylinder engines by merely changing the stator and rotor tooth or pole geometry.

In the present application the invention has been shown for the purpose of illustration applied to magnetos for internal combustion engines.

As will be seen from the specification, the device is applicable with but slight modifications to engines of 3, 6, 9, 12, 18, 21 or 24 cylinders.

It is also pointed out that the basic magnetic geometry is applicable also to either synchronized alternators for capacity discharge systems or breaker point actuated magnetos of the more conventional high tension type. Although the same basic principles may be applied to the construction of other devices such as synchronous electric motors or clocks.

Figure 1:
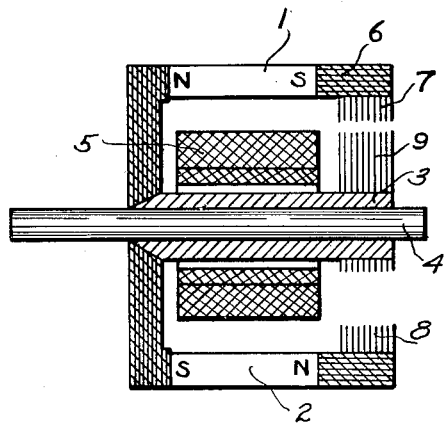
Fig. 1 is a diagrammatic view of the invention shown applied to a magnetic circuit.
Figure 2:
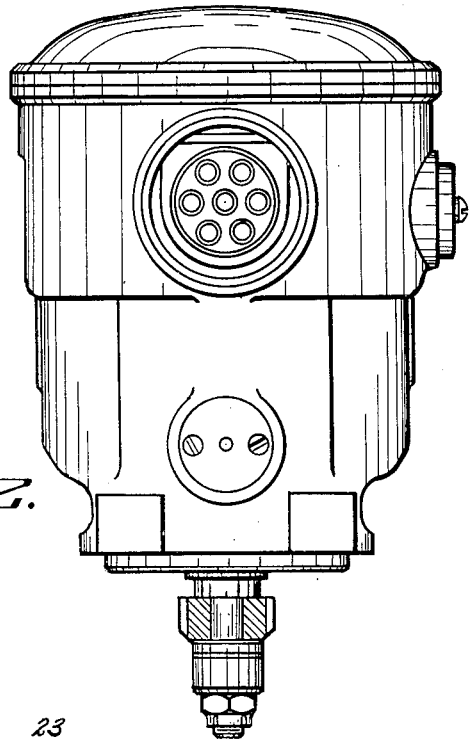
Fig. 2 is a side view of a fourteen cylinder, one-half engine speed magneto constructed according to the invention.
Figure 3:
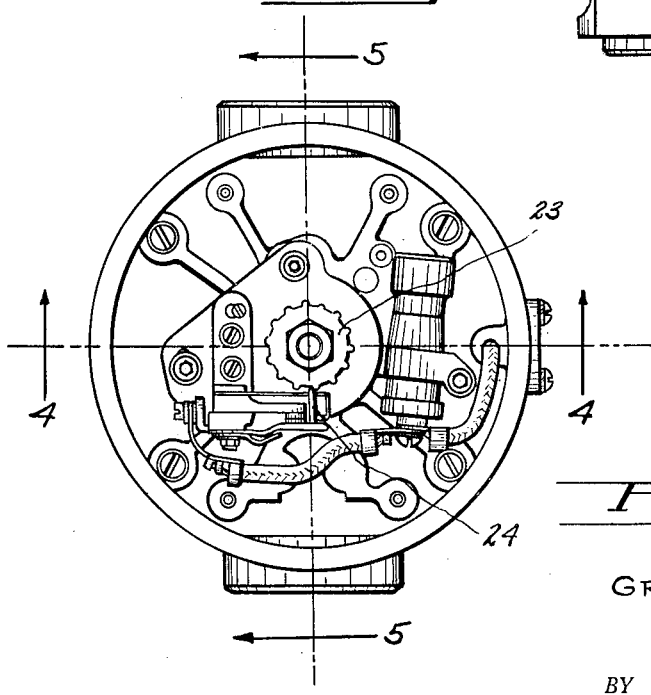
Fig. 3 is an end view, with the cover removed, of the magneto shown in Fig. 2.
Figure 4:
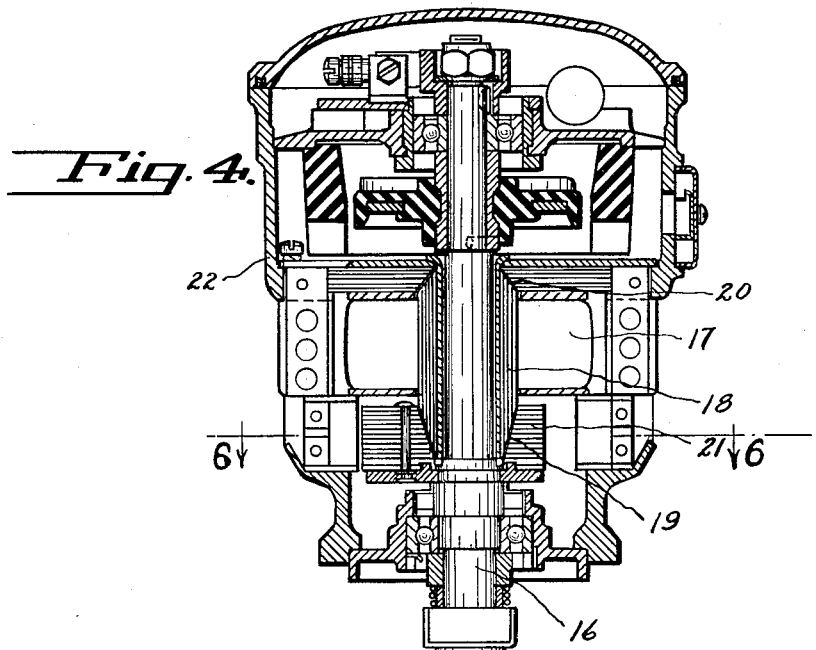
Fig. 4 is a sectional view taken on line 4—4 of Fig. 3.
Figure 5:
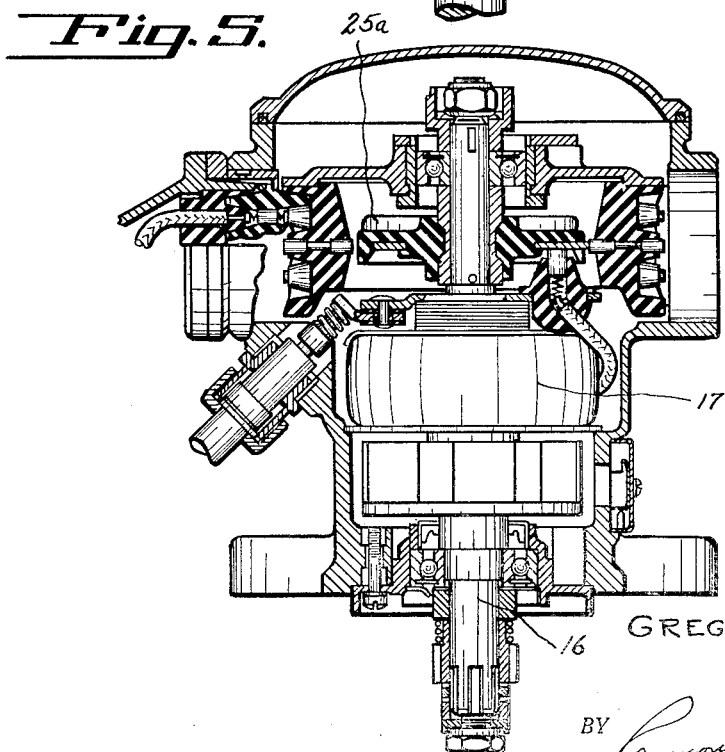
Fig. 5 is a sectional view taken on line 5—5 of Fig. 3, looking in the direction of the arrows.

Referring more particularly to the drawings wherein similar reference characters designate corresponding parts throughout the several views, in Fig. 1, which is a diagrammatic view of the invention shown applied to a magnetic circuit, there is shown a pair of permanent magnets, 1 and 2, oppositely disposed from the magnetic sleeve 3 which is mounted for rotation with the shaft 4.

Surrounding the magnetic sleeve 3 is positioned the coil 5.

The magneto housing has the laminated pole piece 6, supporting the permanent magnets 1 and 2, and also supports the laminated stator poles 7 and 8. Surrounding the magnetic core or sleeve 3 is positioned the coil 5.

The magneto housing 6, supporting the permanent magnets 1 and 2, also supports the laminated stator poles 7 and 8 and on the magnetic sleeve 3 is positioned and laminated rotor member 9 adapted to be rotated upon rotation of the sleeve 3 and shaft 4.

The device employs a novel magnetic circuit in which the flux is carried along or through the rotating shaft 4 or through the magnetic sleeve 3 surrounding the shaft in a direction parallel to its axis. The arrangement provides for the production of rapid flux reversals in this shaft 4 or sleeve 3 and the winding or coil 5 is, therefore, mounted coaxially around the shaft in a symmetrical manner.

The rotor 9 merely serves as a magnetic switch in such a manner as to magnetically associate this end of the rotor shaft 4 alternately with north and south poles of the stationary magnetic pole pieces 7 and 8 which are carried at the rotor ends of the two stationary field or permanent magnets 1 and 2 mounted substantially diametrically opposite each other on diametrically opposite sides of the rotor and coil.

The circuit, shown in Fig. 1, is in the simplest two-pole form in order to facilitate the explanation of the function of the rotor element 9 in acting as a magnetic switch.

Consideration of Fig. 1 will show that rotation of the shaft 4 and laminated rotor member 9 will cause flux to flow through the shaft sleeve 3 or shaft 4 alternately from right to left and from left to right as first one and then the other of the stationary magnets becomes magnetically associated with the rotor 9.

In Figs. 2 to 6 inclusive is shown a one-half engine speed, fourteen cylinder magneto constructed according to this invention. In this form the magneto comprises a pair of permanent magnets 10 and 11 and the stators 12 and 13 each having a pair of pole shoes 14 and 15 respectively. The essential geometry of Fig. 8 may also apply in this design if desired.

The shaft 16 has the coil 17 coaxially mounted thereon surrounding the laminated or wound core, or sleeve 18 having the tapered end faces 19 and 20. The shaft carries the laminated rotor member 21 which is adapted to rotate upon rotation of the shaft and to cooperatively function with the stator poles 14 and 15 of the stators 12 and 13 as described in above in connection with the simple form of device shown in Fig. 1.

The magneto also comprises the casing 22 and conventional breaker cam 23 and breaker arm 24 and the distributing rotor 25a.

Figure 6:
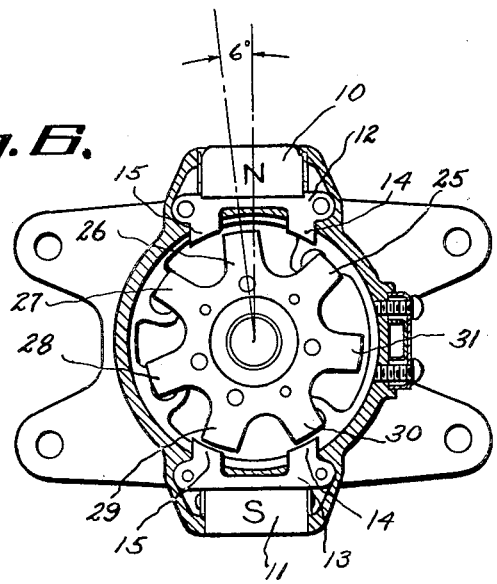
Fig. 6 is a sectional view taken on line 6—6 of Fig. 4, looking in the direction of the arrows, and showing the rotor and stator arrangement.

As shown in Fig. 6, the rotor 21 comprises seven pole members 25 to 31 inclusive which are evenly spaced around the outer edge of the rotor and adapted to cooperatively function with each of the pole shoes 14 and 15 of the stators 12 and 13.

Figure 7:
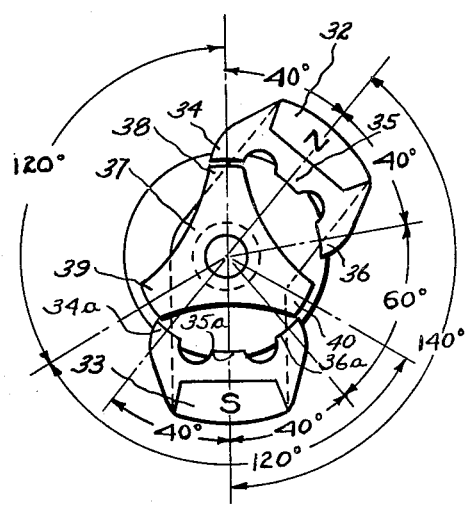
Fig. 7 is an end view of a rotor and stator configuration for an alternator adapted to give nine complete cycles per revolution.

In Fig. 7 will be seen a nine cycle or eighteen pulse arrangement comprising the stationary permanent magnets 32 and 33 each of which has three stator poles 34, 35 and 36 and adapted to cooperatively function with the three pole rotor 37 having the poles 38, 39 and 40.

It will be noted in this form of the invention that the rotor poles 38, 39 and 40 have their centers at one hundred and twenty degree intervals. Also, that the centers of the pole shoes 34A, 35A and 36A on the stator 33 are at forty degree intervals as are the contacts on the contacts 34, 35 and 36 on the stator 32. Examination of Fig. 7 will show that rotation of the shaft and rotor member 37 will cause flux to flow through the shaft sleeve alternator from right to left and from left to right, as first one and then the other stationary magnet becomes magnetically associated with the rotor and that because of the rotor and stator geometry, that is, with the three-pole rotor 37 and three poles on each stator, that the construction will give nine complete cycles per revolution of the rotor.

Figure 8:
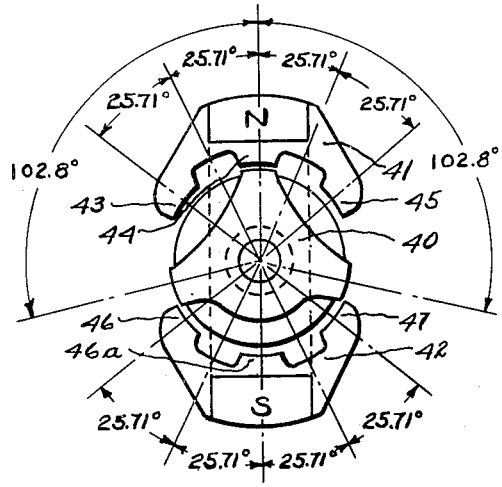
Fig. 8 is a view similar to Fig. 7 of a seven cycle alternator.

In Fig. 8 is shown an end view of a stator and rotor layout for a seven cycle or fourteen pulse machine employing a three-pole rotor 40 and two stators 41 and 42 with the stator 41 having three pole shoes 43, 44 and 45 and the stator 42 having only two pole shoes 46 and 47.

In this construction the three-pole rotor has its poles at irregularly spaced substantially one hundred and twenty degree intervals while the stator 41 has the center of its pole shoes at approximately 51.42 degree intervals and the centers of the pole shoes 46 and 47 are at an interval of approximately 102.84 degrees with the center of the contact shoe 44 approximately 128.5 degrees and the center of the contact shoe 45 being similarly spaced from the center of the contact shoe 47. Because of the three-pole rotor and three pole shoes 43, 44 and 45 on the stator 41 and three pole shoes 46, 46a and 47 on the stator 42, seven complete cycles will be obtained per complete revolution of the rotor 40.

Figure 9:
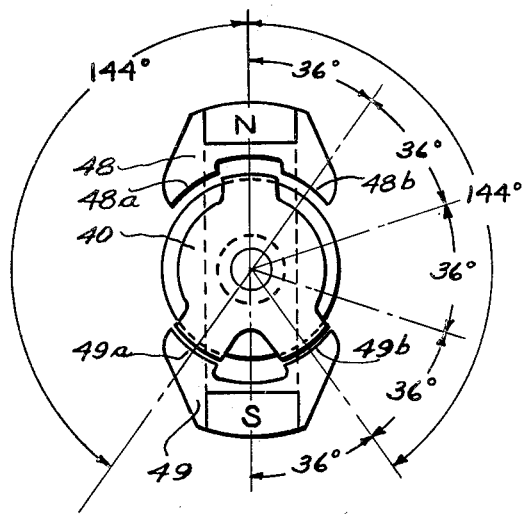
Fig. 9 is a view similar to Figs. 7 and 8 of a five cycle alternator.

In Fig. 9 is shown a five cylinder type having a pair of stators 48 and 49 each having a pair of pole shoes 48a, 48b and 49a and 49b respectively and a three-pole rotor 40.

In this example of the invention the stators 48 and 49 are substantially diametrically opposed and the rotor 40 has two poles having their centers spaced about seventy-two degrees and the centers of said two poles being approximately one hundred and forty-four degrees from the third pole. The pole shoes 48a and 48b on the stator 48 and the pole shoes 49a and 49b on the stator 49 have their centers spaced approximately seventy-two degrees. This arrangement, while shown and described as devised for a five cylinder, one hundred and forty-four degree firing angle magneto, may be employed with equal facility for a ten cylinder, seventy-two degree firing magneto.

Figure 10:
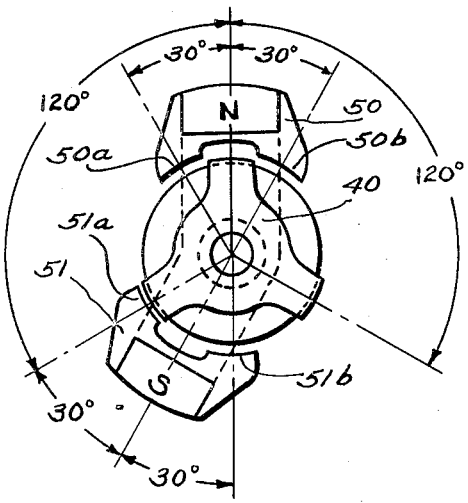
Fig. 10 is a view similar to Figs. 7 to 9 inclusive but showing a six cycle alternator.

In Fig. 10 is shown a six or twelve cylinder execution having a pair of stators 50 and 51 located with respect to each other as shown in the drawing and also a three-pole rotor 40.

In this arrangement the rotor 40 is provided with three poles at approximately one hundred and twenty degree intervals and the stator 50 has two pole shoes 50a and 50b and the two pole shoes 51a and 51b on the stator 51 have their centers approximately sixty degrees apart. The center of the stator 51 is at an angle of approximately one hundred and fifty degrees from the center of the stator 50. With this arrangement the magneto may be employed in connection with a six or twelve cylinder engine.

Figure 11:
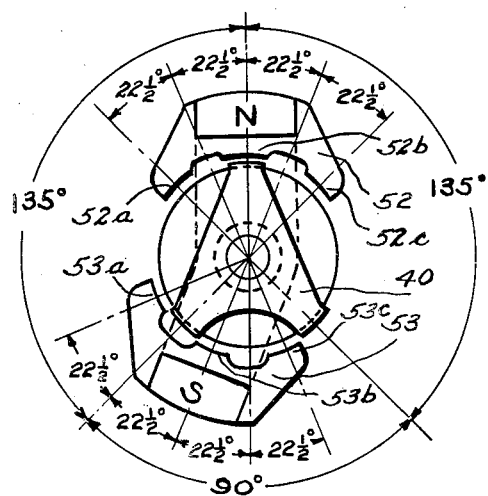
Fig. 11 is a view similar to Figs. 7 to 10 inclusive but showing an eight cycle alternator.
Figure 12:
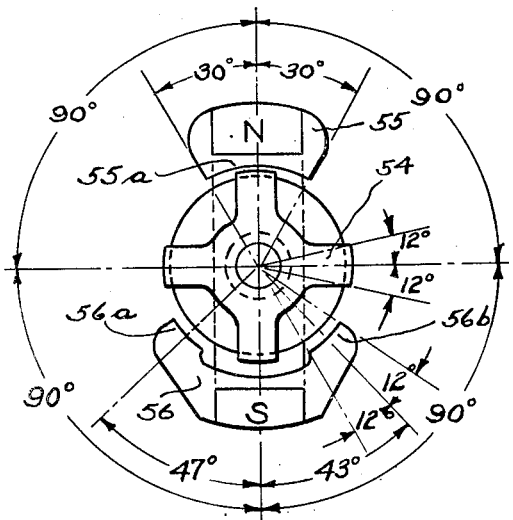
Fig. 12 is a view similar to Figs. 7 to 11 inclusive but showing a four cycle alternator for a sixty degree V–8 engine and with alternate firing angles of sixty degrees and thirty degrees.

In Fig. 11 is shown an eight or sixteen cylinder type having a three pole rotor 40 and a pair of stators 52 and 53, each having three poles 52a, 52b and 52c and 53a, 53b and 53c respectively, and in Fig. 12 is shown a four cycle or eight pulse stagger firing execution having a four-pole rotor 54 and a single shoe stator 55 and a double shoe stator 56.

In this construction the rotor may be a three-pole rotor with two of the poles having their centers spaced approximately ninety degrees and said two poles having their centers at approximately one hundred and thirty-five degrees from the third pole. In this construction the stator 52 has the centers of its three contact shoes 52a, 52b and 52c approximately forty-five degrees from each other and the center of the stator is approximately one hundred fifty-seven and one-half degrees from the center of the stator 53. The three pole shoes 53a, 53b and 53c on the stator 53 have their centers approximately at forty-five degree intervals.

In Fig. 12 a further modification of the invention is shown wherein the pole geometry is so constructed as to produce alternate half cycles of unequal angular relation relative to shaft rotation. This might be described as a "jump-frequency" alternator and corresponds to the situation encountered in a V type engine where, for example, in a sixty degree V-8 engine the angular sequence of power strokes might be sixty degrees—thirty degrees—sixty degrees—thirty degrees, etc. In the form of the invention shown in Fig. 12 the stator 55 has a single shoe stator 55a and a double contact stator 56 and a four pole rotor 54. As will be seen in the drawing, the rotor poles 54 are at ninety degree intervals. The contact of the stator 55 extends sixty degrees and the edges of the pole shoe 55a are positioned at an angle of ninety degrees from the center of each of the pole shoe areas 56a and 56b on the stator 56. In this form of invention one of the rotor poles 54 is aligned with pole on the stator 55 and the pole on the rotor 54, which is diametrically opposed to the first mentioned pole, will be in alignment with the first pole on the stator 56 and when said rotor has rotated a sufficient amount, will be aligned with the second pole on the stator 56. Next, the second set of diametrically opposed poles on the rotor 56 will function in a similar manner. It is pointed out that the poles 54 on the rotor each extend over an angle of twenty-four degrees and that the poles on the stator 56 each extend over an area of twenty-four degrees. It will be seen from a study of Fig. 12 that the geometry of the poles will give firing angles approximately those required in a sixty degree V-8 engine as pointed out above.

The angular relative positions of each of the stators and stator poles has been given in the drawings in each instance and it is not believed necessary to repeat here all of the figures given.

It will be noted from the drawings and the description given above that due to the fact that in most cases the stator members are provided with a plurality of poles or teeth in adjacent relation and which are of like polarity that the flow in flux always divides evenly between the stator poles or teeth and that usually a plurality of rotor poles or teeth registers simultaneously with a plurality of such stator teeth of like polarity and in this manner a plurality of stator teeth are provided for carrying the flux instead of a single tooth, thus reducing the amount of flux carried by each tooth and thereby making maximum use of the available metal and producing at the same time a design in which the flux window or gap area is at a maximum with the effective gap reluctance reduced to a minimum. This arrangement is believed to be clearly illustrated in the form of invention shown in Fig. 6.

It is pointed out that in the invention, as shown and described, an electromagnetic device is provided in which the leakage or magnetic reluctance is decreased.

While the arrangement shown in Fig. 6 is particularly applied to a magneto construction, it is pointed out that by employing this principle, a synchronous motor having increased torque through the simultaneous use of more than one pole piece may be provided.

It is also pointed out that there is shown in the drawings the magnets of unlike polarity separated and spaced from each other and this arrangement allows the provision of multiple tooth stators having adjacent teeth of like polarity which may be spaced at irregular pulse angles or varying alternate pulse angles, thereby providing an arrangement capable of adaptation to many different forms of construction and variation in pulse intervals.

It will also be noted that the rotor member is provided with a plurality of poles arranged to register alternately with north and south poles during rotation of the rotor, but that in doing so in most cases a plurality of teeth on the rotor registers with a plurality of teeth of like polarity on the stator member.

From the above it will be apparent that by proper modification of the pole geometry further embodiments may be made for igniting any type of engine now known to exist.

Having described my invention, I claim:

1. In an electromagnetic device a plurality of stator members of unlike polarity, a rotor member having poles adapted to register with teeth on said stator members and said teeth on said stator members being positioned relative to each other so as to provide pulse intervals of selected irregularity, each of said stator members having a plurality of adjacent teeth of like polarity.

2. In an electromagnetic device a plurality of stator members of unlike polarity, a rotor member having poles adapted to register with teeth on said stator members and said teeth on said stator members being positioned relative to each other so as to provide pulse intervals of selected irregularity, each of said stator members having a plurality of adjacent teeth of like polarity, said rotor member having its poles spaced and adapted to register simultaneously with a plurality of stator teeth of like polarity.

3. In an electromagnetic device a plurality of stator members of unlike polarity, a rotor member having poles adapted to register with teeth on said stator members and said teeth on said stator members being positioned relative to each other so as to provide pulse intervals of selected irregularity, each of said stator members having a plurality of adjacent teeth of like polarity, said poles on said rotor being adapted to register with a plurality of said teeth on said stator during each rotation of said rotor.

4. In an electromagnetic device a plurality of stator members of unlike polarity, a rotor member having poles adapted to register with teeth on said stator members and said teeth on said stator members being positioned relative to each other so as to provide pulse intervals of selected irregularity, each of said stator members having a plurality of adjacent teeth of like polarity, said rotor member having its poles spaced and adapted to register simultaneously with a plurality of teeth on said stator of like polarity, during each rotation of said rotor.

5. An electromagnetic device comprising a pair of stator elements having salient poles, a rotor shaft, a coaxial coil surrounding said rotor shaft, a rotor on said shaft, said rotor and said poles being rotatable relative to each other, said rotor having fewer poles than said stator elements and each rotor pole registering with each stator pole during each rotation of the rotor, each of said stator elements having a permanent magnet of unlike polarity and having their poles oppositely disposed along an axis substantially parallel to the axis of said rotor shaft.

6. An electromagnetic device comprising a pair of stator elements having at least four salient poles, a rotor shaft, a coaxial coil surrounding said rotor shaft, a rotor on said shaft, said rotor and said poles being rotatable relative to each other, said rotor having fewer poles than said stator elements and each rotor pole registering with each stator pole during each rotation of the rotor, each of said stator elements having a permanent magnet of unlike polarity and having their poles oppositely disposed along an axis substantially parallel to the axis of said rotor shaft.

7. An electromagnetic device comprising a pair of stator elements having salient poles, a rotor shaft, a coaxial coil surrounding said rotor shaft, a rotor on said shaft, said rotor and said poles being rotatable relative to each other, said rotor having fewer poles than said stator elements and each rotor pole registering with each stator pole during each rotation of the rotor and said poles on said stator members being positioned relative to each other so as to provide pulse intervals of selected irregularity.

8. An electromagnetic device comprising a pair of stator elements having at least four salient poles, a rotor shaft, a coaxial coil surrounding said rotor shaft, a rotor on said shaft, said rotor and said poles being rotatable relative to each other, said rotor having fewer poles than said stator elements and each rotor pole registering with each stator pole during each rotation of the rotor and said poles on said stator members being positioned relative to each other so as to provide pulse intervals of selected irregularity.

GREGOR L. LANG.

REFERENCES CITED

The following references are of record in the file of this patent:

UNITED STATES PATENTS

| Number | Name | Date |
| --- | --- | --- |
| 1,221,208 | Neuland | Apr. 3, 1917 |
| 1,338,324 | Neuland | Apr. 27, 1920 |
| 2,117,019 | Conrad | May 10, 1938 |
| 2,150,688 | Louis | Mar. 14, 1939 |
| 2,254,919 | Smith | Sept. 2, 1941 |
| 2,355,047 | Bennett | Aug. 8, 1944 |